March 24, 1942.   G. SIMSON   2,277,418
HYDRAULIC VALVE OPERATING SYSTEM
Filed Aug. 29, 1940

Inventor
G. Simson
by J. Edw. Maybee
ATTY.

Patented Mar. 24, 1942

2,277,418

UNITED STATES PATENT OFFICE 2,277,418

HYDRAULIC VALVE OPERATING SYSTEM

Godfrey Simson, Toronto, Ontario, Canada

Application August 29, 1940, Serial No. 354,721

5 Claims. (Cl. 123—90)

This invention relates to hydraulic valve operating systems and more particularly to that type employed in internal combustion engines for actuating the poppet valves thereof and my object is to devise simple means of this character for so actuating the valves that they will be non-sluggish in operation. Further objects I have in mind will appear from the following description.

Figure 1:
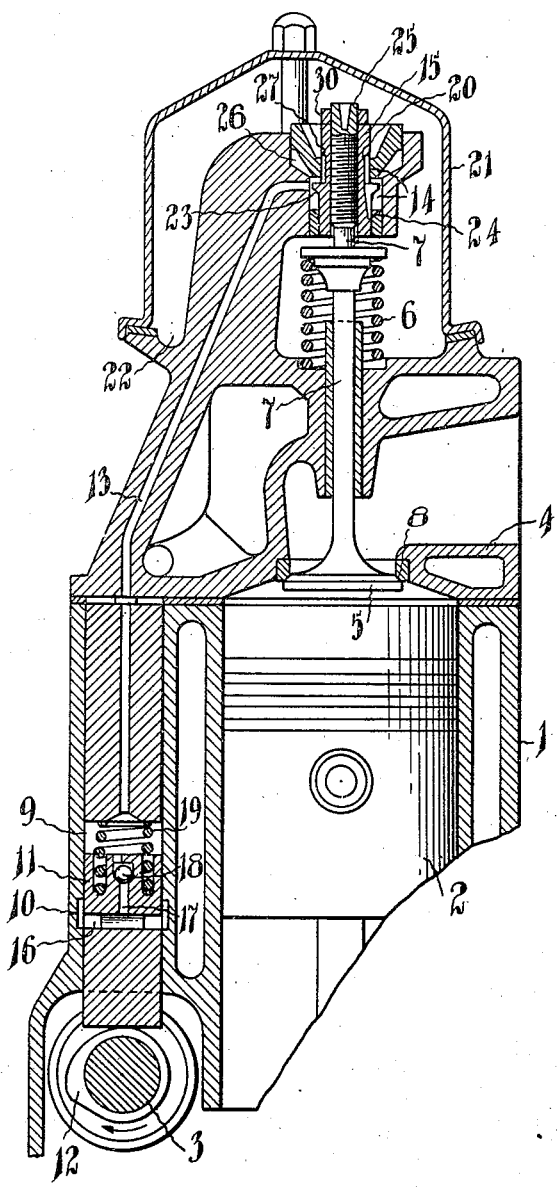
Figure 2:
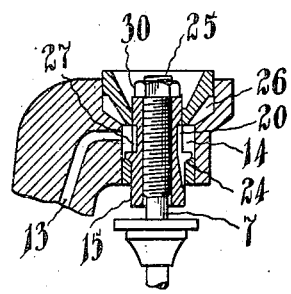
Figure 3:
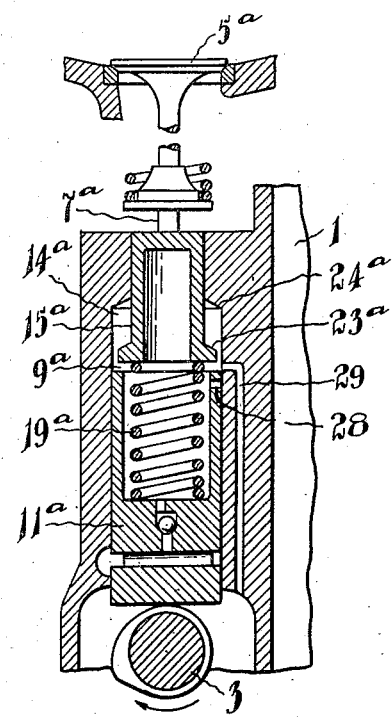

I attain my objects by means of the constructions hereinafter described and illustrated in the accompanying drawing in which Fig. 1 is a sectional detail of part of an engine showing my valve operating system;

Fig. 2 a sectional detail of a plunger in its position for fully opening a valve; and Fig. 3 a sectional detail of a modified form of my invention.

In the drawing like numerals of reference indicate the corresponding parts in the different figures.

1 is a cylinder of an internal combustion engine. In the cylinder is mounted a piston 2 which is connected in the usual way to a crank shaft (not shown). The latter drives the cam shaft 3 in any well known manner. In the cylinder head 4 is guided a poppet valve 5 having the usual spring 6 disposed on the valve stem 7 tending to maintain the valve closed on its seat 8.

The engine cylinder 1 carries a fluid cylinder 9 which is supplied with oil by a duct 10 from the usual pump fed oiling system of the engine. A piston 11 actuated by a cam 12 on the cam shaft 3 forces the oil from the cylinder 9 through a fluid line 13 to a chamber 14. A plunger 15 operating in the chamber 14 engages the stem 7 of the valve to open it.

Any suitable means may be employed to cut off the oil supply duct 10 from the fluid under pressure in the fluid cylinder 9. The piston 11 is provided with an annular groove 16 adapted to register with the duct 10 and a central passage 17 communicating with said groove and the cylinder 9 above the piston. In this passage is carried a ball check valve 18 which permits the oil to flow, under the pressure of the usual pump in the oiling system, through said passage, the cylinder 9, fluid line 13 and into the chamber 14. Immediately the cam 12 moves the piston 11, the pressure of the oil in the cylinder 9 exceeds that of the oil in the duct 10 whereby the ball check valve 18 is automatically closed and oil under this excess pressure is supplied to the chamber 14 to actuate the plunger 15. A spring 19 moves the piston into engagement with the low portion of the cam 12.

Air is bled from the system by one or more slits 20 formed in the plunger 15 and terminating intermediate its ends. Referring to Fig. 1 in which the plunger 15 is in its initial position with the valve 5 in its closed position, it will be noted that the upper end of the slit 20 extends above the chamber and establishes communication between the latter and the interior of a casing 21 having a sump 22 for receiving the oil bled from the system. In this position of the plunger the lower end of the slit is closed whereas in Fig. 2, in which the plunger 15 has been moved to its final position in which the valve is opened, the upper end of the slit is closed and the lower end thereof extends below the chamber to establish communication between the chamber and the casing again. The opposite ends of the slit 20 are within the chamber to close the bleed during the movement of the plunger from its initial to final positions. The sump 22 communicates with the crank case of the engine from which the oil for the lubricating and the valve operating systems is supplied.

The plunger 15 is provided with a shoulder 23 for engaging a stop 24 to positively limit the movement of the plunger in its final or valve opening position. A screw 25 threaded longitudinally in the plunger 15 engages the stem 7 of the poppet valve. By turning the screw, the plunger will be axially moved relative to the stop 24 to vary the stroke of the plunger and thus the amount of movement imparted to the valve 5. A lock nut 30 is provided to retain the screw as adjusted.

The chamber 14 is provided with an annular air pocket 26. Air trapped therein is compressed by the oil immediately pressure is applied thereto by the piston 11 whereby the air serves as a shock absorber until the inertia of the plunger and valve is overcome. Thereafter the air is further compressed during the movement of the plunger while the bleed means is closed. Thus when the plunger reaches its final position in which the bleed means is open, the highly compressed air assists the liquid in maintaining the maximum pressure on the plunger 15 to retain the valve 5 in its open position while the high portion of the cam 12 moves past its point of contact with the piston 11.

The plunger may be provided with one or more slits 27 which are shorter than the bleed slits 20 to increase the volume of liquid spilled into the sump 22 when the plunger is in its initial position. Any air in the line 13 is thus quickly expelled to prevent the formation of air locks. The cam 12 is so shaped that pressure is applied to the liquid in the cylinder 9 immediately the high portion of the cam actuates the piston 11. The volume of liquid displaced by the piston 11 is much greater than that displaced by the plunger 15 and thus the latter is moved rapidly towards its stop 24. After the cam 12 has been rotated to relieve the pressure of the oil, the valve spring 6 will close the valve 5 and at the same time return the plunger 15 to its initial position.

In Fig. 3 the bleed means is controlled by the valve operating piston 11ª which is provided with a port 28 adapted to register with the bleed 29 formed in the wall of the cylinder 9ª when the piston is in its final position in which the poppet valve is opened. The bleed 29 communicates with the cylinder 9ª when the piston 11ª is in its initial position in which the poppet valve is closed. In this form of the invention, the plunger 15ª reciprocates in the chamber 14ª, formed at the upper end of the cylinder 9ª, to actuate the poppet valve 5ª of an L head engine. The plunger is provided with a shoulder 23ª for engaging a stop 24ª to limit its movement.

It will be understood that various other modifications may be made without departing from the spirit of my invention.

What I claim as my invention is:

1. A hydraulically actuated plunger for operating a normally closed poppet valve to open it; a chamber in which the plunger operates; and means for bleeding said chamber, the means comprising a slit extending longitudinally of the plunger and terminating intermediate its ends, one end of the slit being outside the chamber when the plunger is in its initial position, the other end of the slit being outside the chamber when the plunger is in its final position, both ends of the slit being within the chamber to close the bleed means during the movement of the plunger from its initial to final positions.

2. In a hydraulic valve operating system, a cylinder communicating with a source of fluid supply; a mechanically actuated piston in said cylinder; a normally closed poppet valve; a plunger for opening said valve; a chamber in which the plunger operates, the chamber being in communication with the cylinder; and means controlled by one of said piston and plunger parts for bleeding the system, the said means communicating with the exterior of the chamber to bleed the system when the poppet valve is in its initially closed position and also when said valve is in its fully open position, the said means being closed by the plunger during the movement of the valve from its closed position to its open position.

3. A hydraulically actuated plunger for operating a normally closed poppet valve to open it; a chamber in which the plunger operates; and means controlled by said plunger for bleeding said chamber, the said means being opened by the plunger to communicate with the exterior of the chamber to bleed the latter when the plunger is in its initial position in which the poppet valve is closed and also when the plunger nears its final position in which the valve is opened, the said means being closed by the plunger during the movement of the plunger from its initial position to its final position.

4. A hydraulically actuated plunger for operating a normally closed poppet valve to open it; a chamber in which the plunger operates; means controlled by said plunger for bleeding said chamber, the said means being opened by the plunger to bleed the chamber when the plunger is in its initial position in which the valve is closed and also when the plunger nears its final position in which the valve is opened, the said means being closed by the plunger during the movement of the plunger from its initial to final positions; and an air pocket in said chamber, the air in said pocket being compressed while the bleed means is closed during the movement of the plunger from its initial to final positions and being adapted to apply pressure to the liquid in the chamber when the bleed means is again opened by the plunger as the latter nears its final position.

5. In a hydraulic valve operating system, a cylinder communicating with a source of liquid supply; a piston operating in said cylinder; a normally closed poppet valve; a plunger for opening said valve; a chamber in which the plunger operates, the chamber being in communication with the cylinder; a cam having high and low portions for actuating the piston to supply liquid under pressure to the chamber; means controlled by said plunger for bleeding said chamber, the said means being opened by the plunger to communicate with the exterior of the chamber to bleed the latter when the plunger is in its initial position in which the poppet valve is closed and also when the plunger nears its final position in which the valve is opened, the said means being closed by the plunger during the movement of the plunger from its initial to final positions; and an air pocket in said chamber, the air in said pocket being compressed while the bleed means is closed during the movement of the plunger from its initial to final positions and being adapted to expand when the bleed means is again opened by the plunger as the latter nears its final position whereupon the air pressure is utilized to maintain the poppet valve in its open position until the low portion of the cam causes the pressure of the liquid to be reduced.

GODFREY SIMSON.